United States Patent
Pero

(10) Patent No.: US 8,151,551 B2
(45) Date of Patent: Apr. 10, 2012

(54) VARIABLE AREA FAN NOZZLE THRUST REVERSER

(75) Inventor: Edward B. Pero, Somers, CT (US)

(73) Assignee: United Technologies Corporation, Hartford, CT (US)

(*) Notice: Subject to any disclaimer, the term of this patent is extended or adjusted under 35 U.S.C. 154(b) by 613 days.

(21) Appl. No.: 12/306,329

(22) PCT Filed: Oct. 12, 2006

(86) PCT No.: PCT/US2006/039957
§ 371 (c)(1),
(2), (4) Date: Dec. 23, 2008

(87) PCT Pub. No.: WO2008/045070
PCT Pub. Date: Apr. 17, 2008

(65) Prior Publication Data
US 2009/0193789 A1 Aug. 6, 2009

(51) Int. Cl.
*F02K 3/02* (2006.01)
(52) U.S. Cl. ............................ 60/226.2; 60/226.3
(58) Field of Classification Search ............. 60/226.2, 60/226.3; 244/110 B; 239/265.37
See application file for complete search history.

(56) References Cited

U.S. PATENT DOCUMENTS

| | | | | |
|---|---|---|---|---|
| 3,483,702 | A * | 12/1969 | Ward | 60/229 |
| 3,779,010 | A | 12/1973 | Chamay et al. | |
| 3,815,357 | A * | 6/1974 | Brennan | 60/226.2 |
| 4,922,713 | A | 5/1990 | Barbarin et al. | |
| 5,706,649 | A | 1/1998 | Robinson et al. | |
| 6,439,504 | B1 * | 8/2002 | Ahrendt | 244/110 B |
| 2004/0068978 | A1 * | 4/2004 | Lair et al. | 60/226.2 |
| 2005/0086927 | A1 | 4/2005 | Lair et al. | |
| 2008/0010969 | A1 * | 1/2008 | Hauer et al. | 60/204 |

FOREIGN PATENT DOCUMENTS

FR 2146109 7/1971

OTHER PUBLICATIONS

Search Report and Written Opinion mailed on Sep. 20, 2007 for PCT/US2006/039957.
International Preliminary Report on Patentability dated Feb. 2, 2009.

* cited by examiner

*Primary Examiner* — Louis Casaregola
*Assistant Examiner* — Phutthiwat Wongwian
(74) *Attorney, Agent, or Firm* — Carlson, Gaskey & Olds, P.C.

(57) ABSTRACT

A nozzle for use in a gas turbine engine includes nozzle doors coupled with a fan nacelle wherein the nozzle doors move in unison between a plurality of positions to influence a bypass airflow through a fan bypass passage. A linkage connects the nozzle doors and an actuator. A louver section coupled with the linkage moves in unison with the nozzle doors between a plurality of louver positions to direct a portion of the bypass airflow in a selected direction.

27 Claims, 4 Drawing Sheets

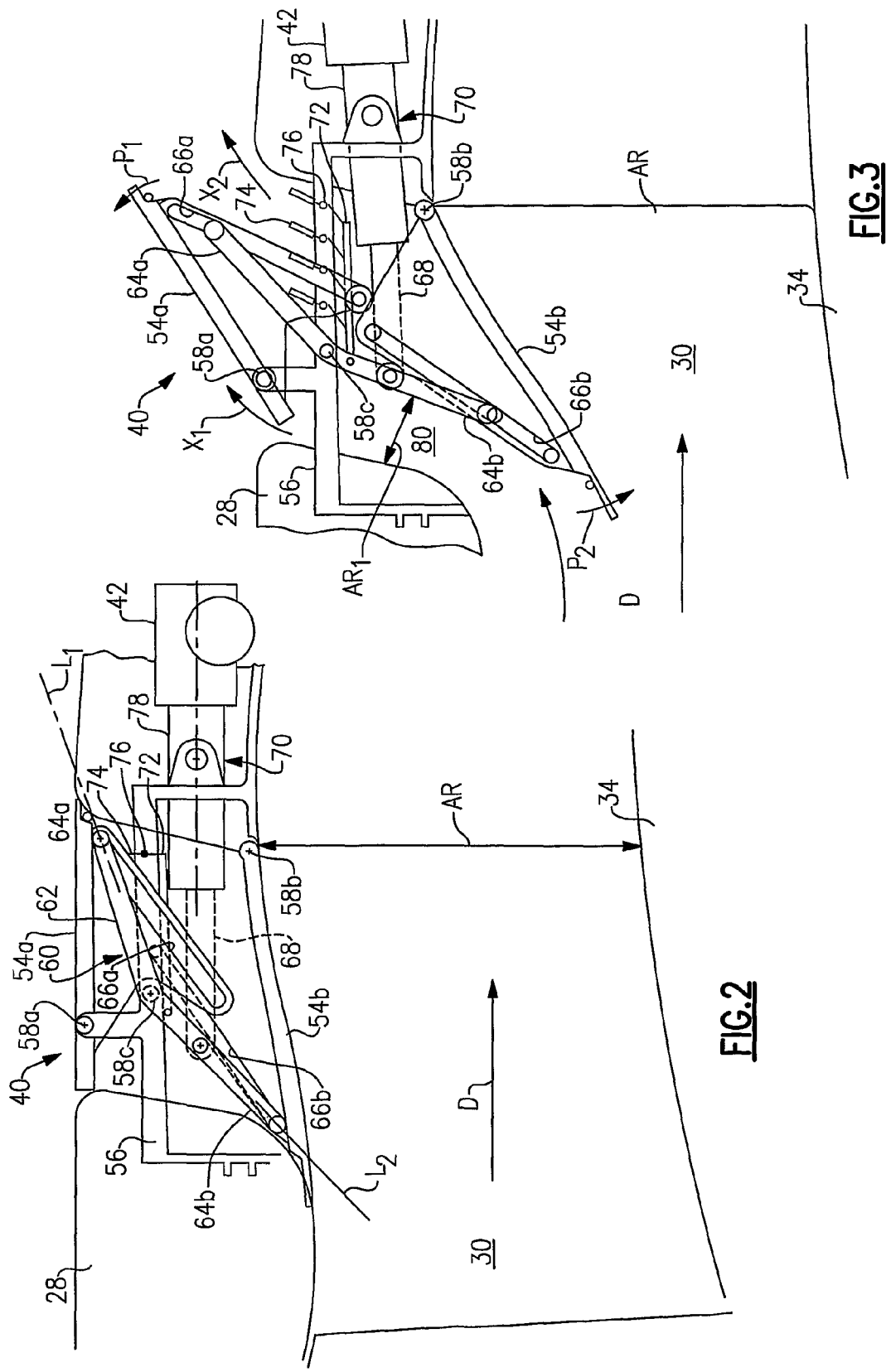

VARIABLE AREA FAN NOZZLE THRUST REVERSER

BACKGROUND OF THE INVENTION

This invention relates to gas turbine engines and, more particularly, to a gas turbine engine having a variable fan nozzle integrated with a thrust reverser of the gas turbine engine.

Gas turbine engines are widely known and used for power generation and vehicle (e.g., aircraft) propulsion. A typical gas turbine engine includes a compression section, a combustion section, and a turbine section that utilize a primary airflow into the engine to generate power or propel the vehicle. The gas turbine engine is typically mounted within a housing, such as a nacelle. A bypass airflow flows through a passage between the housing and the engine and exits from the engine at an outlet.

Presently, conventional thrust reversers are used to generate a reverse thrust force to slow forward movement of a vehicle, such as an aircraft. One type of conventional thrust reverser utilizes a moveable door stowed near the rear of the nacelle. After touch-down of the aircraft for landing, the door moves into the bypass airflow passage to deflect the bypass airflow radially outwards into cascades, or vents, that direct the discharge airflow in a forward direction to slow the aircraft. Although effective, this and other conventional thrust reversers serve only for thrust reversal and, when in the stowed position for non-landing conditions, do not provide additional functionality. The limited functionality and the weight that a conventional thrust reverser adds to the engine contribute to engine inefficiency. Therefore, in order to improve engine efficiency, there is a need for a system having a thrust reverser that is integrated with at least one other engine system for additional functionality outside of landing.

SUMMARY OF THE INVENTION

An example nozzle for use in a gas turbine engine includes nozzle doors coupled with a fan nacelle wherein the nozzle doors move in unison between a plurality of positions to influence a bypass airflow through a fan bypass passage. A linkage connects the nozzle doors and an actuator. A louver section coupled with the linkage moves in unison with the nozzle doors between a plurality of louver positions to direct a portion of the bypass airflow in a selected direction.

In one example, the plurality of positions of the nozzle doors include a stowed position that corresponds to an aircraft cruise condition, an intermediate position that corresponds to an aircraft take-off condition, and a thrust reverse position that corresponds to an aircraft landing condition.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

FIG. 2 is a schematic view of example nozzle doors and linkage of the nozzle shown in FIG. 1, in a stowed position.

FIG. 3 is a schematic view of the example nozzle doors and linkage of the nozzle shown in FIG. 1, in an intermediate position.

DETAILED DESCRIPTION OF THE PREFERRED EMBODIMENT

Figure 1:
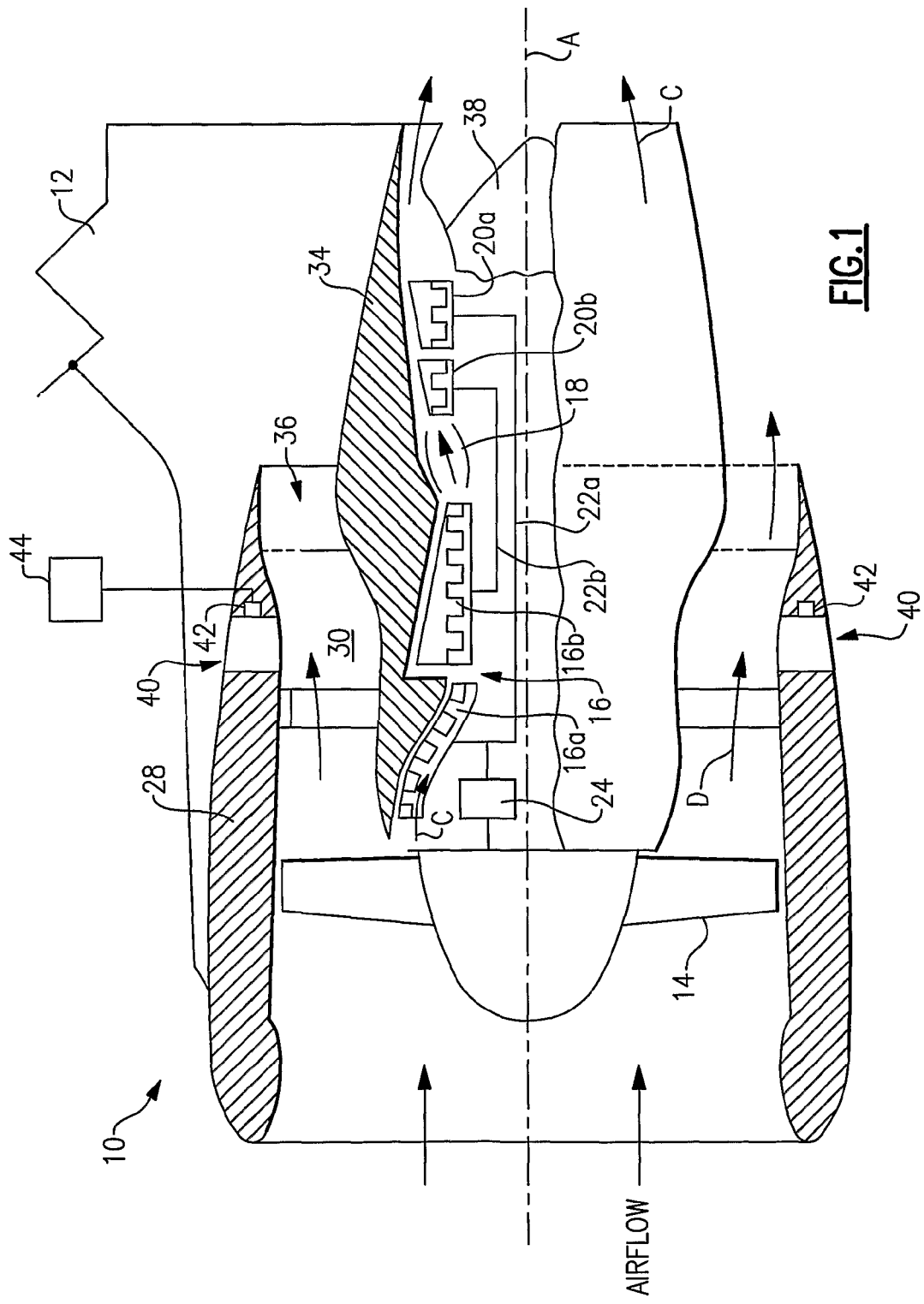
FIG. 1 illustrates selected portions of an example gas turbine engine system having a nozzle that integrates functions of a variable fan nozzle and a thrust reverser.

FIG. 1 illustrates a schematic view of selected portions of an example gas turbine engine 10 suspended from an engine pylon 12 of an aircraft, as is typical of an aircraft designed for subsonic operation. The gas turbine engine 10 is circumferentially disposed about an engine centerline, or axial centerline axis A. The gas turbine engine 10 includes a fan 14, a low pressure compressor 16a, a high pressure compressor 16b, a combustion section 18, a low pressure turbine 20a, and a high pressure turbine 20b. As is well known in the art, air compressed in the compressors 16a, 16b is mixed with fuel that is burned in the combustion section 18 and expanded in the turbines 20a and 20b. The turbines 20a and 20b are coupled for rotation with, respectively, rotors 22a and 22b (e.g., spools) to rotationally drive the compressors 16a, 16b and the fan 14 in response to the expansion. In this example, the rotor 22a also drives the fan 14 through a gear train 24.

In the example shown, the gas turbine engine 10 is a high bypass geared turbofan arrangement. In one example, the bypass ratio is greater than 10:1, and the fan 14 diameter is substantially larger than the diameter of the low pressure compressor 16a. The low pressure turbine 20a has a pressure ratio that is greater than 5:1, in one example. The gear train 24 can be any known suitable gear system, such as a planetary gear system with orbiting planet gears, planetary system with non-orbiting planet gears, or other type of gear system. In the disclosed example, the gear train 24 has a constant gear ratio. Given this description, one of ordinary skill in the art will recognize that the above parameters are only exemplary and that other parameters may be used to meet the particular needs of an implementation.

An outer housing, nacelle 28, (also commonly referred to as a fan nacelle) extends circumferentially about the fan 14. A generally annular fan bypass passage 30 extends between the nacelle 28 and an inner housing, inner cowl 34, which generally surrounds the compressors 16a, 16b and turbines 20a, 20b.

In operation, the fan 14 draws air into the gas turbine engine 10 as a core flow, C, and into the bypass passage 30 as a bypass air flow, D. In one example, approximately 80 percent of the airflow entering the nacelle 28 becomes bypass airflow D. A rear exhaust 36 discharges the bypass air flow D from the gas turbine engine 10. The core flow C is discharged from a passage between the inner cowl 34 and a tail cone 38. A significant amount of thrust may be provided by the bypass airflow D due to the high bypass ratio.

The example gas turbine engine 10 shown FIG. 1 also includes a nozzle 40 (shown schematically) associated with the bypass passage 30. In this example, the nozzle 40 is forward of a trailing edge of the nacelle 28, however, in other examples, the nozzle 40 is located farther forward or at the trailing edge of the nacelle 28. In this example, the nozzle 40 is coupled with the nacelle 28.

The nozzle 40 includes actuators 42 for movement between a plurality of positions to influence the bypass air flow D, such as to manipulate an air pressure of the bypass air flow D. A controller 44 commands the actuators 42 to selectively move the nozzle 40 among the plurality of positions to manipulate the bypass air flow D in a desired manner. The controller 44 may be dedicated to controlling the actuators 42 and nozzle 40, integrated into an existing engine controller within the gas turbine engine 10, or be incorporated with other known aircraft or engine controls. For example, selective movement of the nozzle 40 permits the controller 44 to vary the amount and direction of thrust provided, enhance conditions for aircraft control, enhance conditions for operation of the fan 14, or enhance conditions for operation of other components associated with the bypass passage 30, depending on input parameters into the controller 44.

In one example, the gas turbine engine 10 is designed to operate within a desired performance envelope under certain predetermined conditions, such as cruise. For example, it is desirable to operate the fan 14 under a desired pressure ratio range (i.e., the ratio of air pressure forward of the fan 14 to air pressure aft of the fan 14) to avoid fan flutter. To maintain this range, the nozzle 40 is used to influence the bypass airflow D to control the air pressure aft of the fan 14 and thereby control the pressure ratio. For cruise, the nozzle 40 is closed and the pressure ratio is controlled by the rear exhaust 36. In some examples, the nozzle varies a cross-sectional area associated with the bypass passage 30 by approximately 20% to increase the bypass airflow D for take-off. Thus, the nozzle 40 enables the performance envelope to be maintained over a variety of different flight conditions.

FIG. 2 illustrates selected portions of an example nozzle 40 having a first nozzle door 54a and a second nozzle door 54b. The first nozzle door 54a is located radially outwards of the second nozzle door 54b relative to the centerline axis A.

In this example, the nacelle 28 supports a frame 56 that in turn supports the nozzle doors 54a and 54b. The first nozzle door 54a is pivotally connected to the frame 56 at a first pivot connection 58a and the second nozzle door 54b is pivotally connected to the frame 56 and a second pivot connection 58b. Known types of pivot connections are used in this example.

A linkage 60 connects the nozzle doors 54a and 54b with the actuator 42. In the illustrated example, the linkage 60 includes a first link 62 having opposed sections 64a and 64b that are slidingly received within respective slots 66a and 66b using a known type of sliding connection, such as with a friction member, bushing, guide member, or other connection. In this example, the section 64a extends in a lengthwise direction along axis $L_1$ and the section 64b extends in a lengthwise direction along axis $L_2$, which is transverse to $L_1$. A second link 68 is pivotally connected at one end with the first link 62 and at the other end with a trunnion pivot 70 to the actuator 42.

The first link 62 is pivotally connected to the frame 56 at pivot connection 58c and connected to a louver rod 72. The louver rod 72 is coupled to louvers 74 that are each moveable about corresponding pivots 76 such that movement of the first link 62 moves the louver rod 72 to thereby move the louvers 74 about the pivots 76.

In the illustrated example, the nozzle doors 54a and 54b are in a stowed position. In the stowed position, the nozzle 40 defines a cross-sectional area, AR, which corresponds to the cross-sectional area of the annular bypass passage 30 adjacent the nozzle 40. As will now be described, the controller 44 selectively commands the actuator 42 to move the nozzle doors 54a and 54b in unison to an intermediate position or a thrust reverse position to influence the bypass airflow D in a desired manner, depending on flight conditions (e.g., take-off, landing, and cruise).

FIG. 3 schematically illustrates the nozzle doors 54a and 54b in an example intermediate position. In one example, the controller 44 commands the actuator 42, in response to take-off, to move the nozzle doors 54a and 54b to the intermediate position. Take-off may be indicated using known parameters, such as rotor 22a or 22b speed, weight on a landing gear of an aircraft, aircraft speed, etc.

To move the nozzle doors 54a and 54b, the actuator 42 retracts the actuator rod 78, which in turn moves the second link 68. Movement of the second link 68 causes the first link 62 to pivot about the pivot connection 58c such that the sections 64a and 64b slide along the respective slots 66a and 66b. The movement of the sections 64a and 64b within the slots 66a and 66b causes the nozzle doors 54a and 54b to pivot about respective pivot connections 54a and 54b in the directions indicated at $P_1$ and $P_2$. The first nozzle door 54 pivots in forward direction $P_1$ and the second nozzle door 54b pivots in aft direction $P_2$.

In the intermediate position, the first nozzle door 54a extends radially outwards from the nacelle 28, and the second nozzle door 54b extends radially inwards from the nacelle 28 into the bypass passage 30. This opens up an auxiliary passage 80 for discharge of a portion of the bypass airflow D from the bypass passage 30 in an aft direction $X_1$. Discharging the portion of the bypass airflow D in the aft direction $X_1$ provides the benefit of maintaining at least a portion of the thrust generated by the bypass airflow D.

The auxiliary passage 80 also provides additional cross-sectional area $AR_1$ that influences the bypass airflow D. For example, a relatively smaller overall cross-sectional area (AR plus $AR_1$) would restrict the bypass airflow D and produce a pressure build-up (i.e., an increase in air pressure) within the bypass passage 30. A relatively larger cross-sectional area permits more bypass airflow D and reduces the pressure build-up (i.e., a decrease in air pressure). Thus, depending on the input parameters into the controller 44, the controller 44 commands the actuator 42 to move the nozzle doors 54a and 54b to a desired intermediate position to control the bypass airflow D in a desired manner.

In the illustrated example, movement of the first link 62 also causes the louver rod 72 to move the louvers 74. In the illustrated position, the louvers 74 direct a portion of the bypass airflow D conveyed through the passage 80 that discharges aft of the first nozzle door 54a in an aft direction $X_2$. Directing the flow in the aft direction $X_2$ provides the benefit of maintaining at least a portion of the thrust generated by the bypass airflow D.

Figure 4:
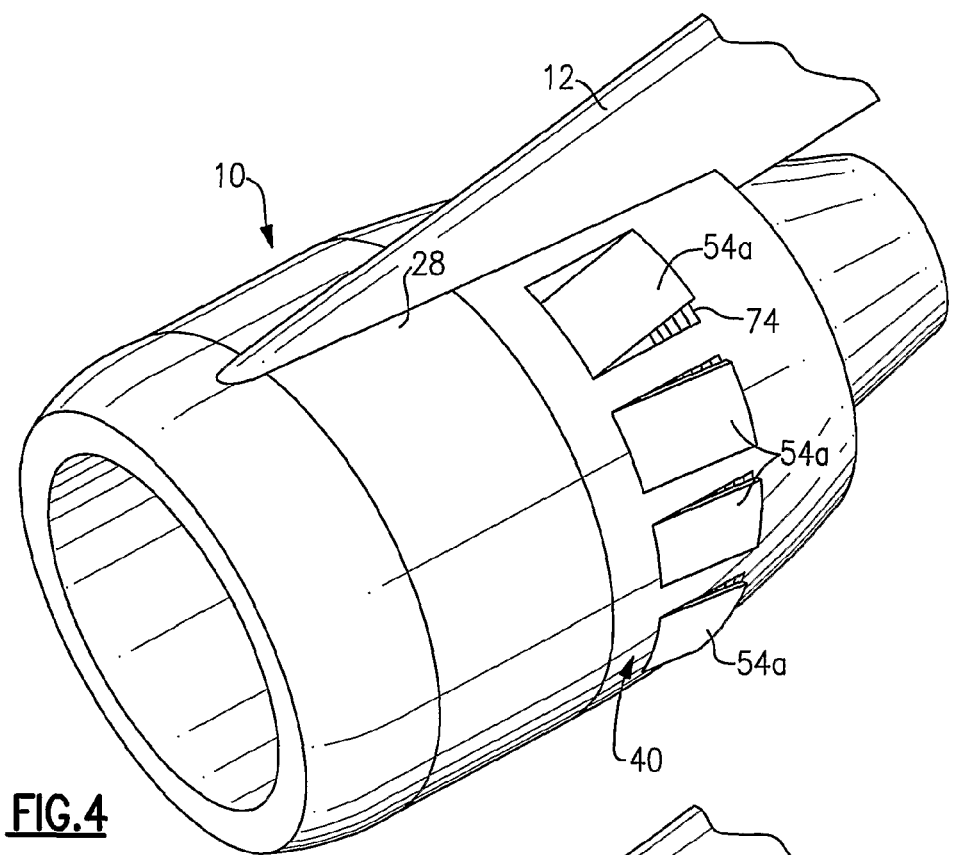
FIG. 4 is a perspective view of the nozzle doors in the intermediate position.

Referring to the example shown in FIG. 4, pairs of nozzle doors 54a and 54b (not shown) are spaced about the circumference of the nacelle 28 to influence the bypass airflow D as described above. In this example, each pair of nozzle doors 54a and 54b includes a corresponding actuator 42 that communicates with the controller 44. Thus, the controller 44 can move all of the pairs of nozzle doors 54a and 54b in unison. Given this description, one of ordinary skill in the art will recognize alternative arrangements of the nozzle doors 54 and 54b to meet their particular needs.

Figure 6:
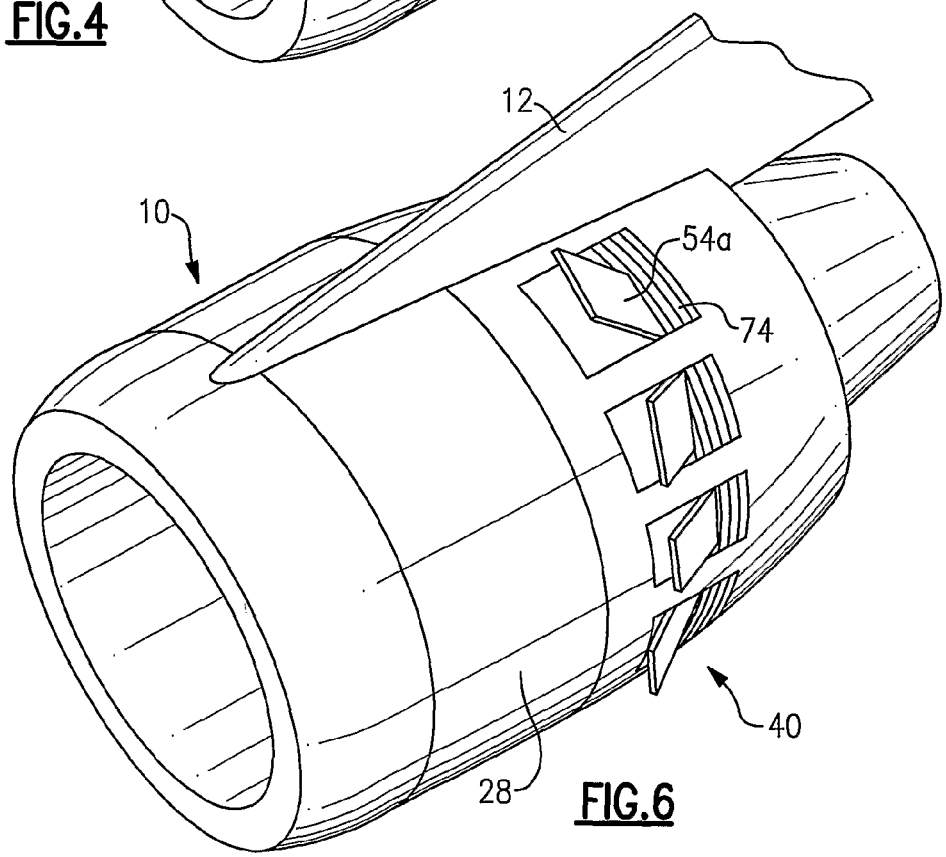
FIG. 6 is a perspective view of the example nozzle doors and linkage in the thrust reverse position.
Figure 5:
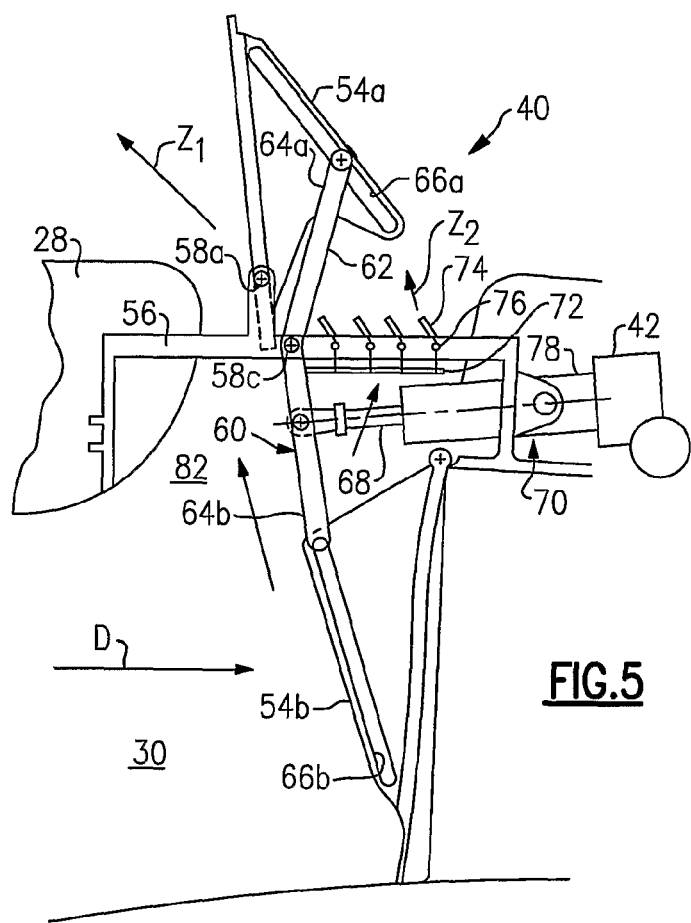
FIG. 5 is a schematic view of the example nozzle doors and linkage of the nozzle shown in FIG. 1, in a thrust reverse position.

FIGS. 5 and 6 schematically illustrate the nozzle doors 54a and 54b in an example thrust reverse position for slowing forward movement of an aircraft. In one example, in response to a landing condition, the controller 44 commands the actuator 42 to move the nozzle doors 54a and 54b using the linkage 60 to the thrust reverse position illustrated. The landing condition may be indicated from a landing gear of an aircraft, a sensor that detects a weight on the landing gear, aircraft altitude, or other known indicator.

To move to the thrust reverse position, the actuator further retracts the actuator rod 78, which in turn further moves the second link 68 and causes the first link 62 to move the nozzle doors 54a and 54b about the respective pivot connections 54a and 54b. In the thrust reverse position, the second nozzle door 54b extends farther into the bypass passage 30 to deflect a significant portion of the bypass airflow D through passage 82. The first nozzle door 54a further deflects the bypass airflow D in a forward direction, $Z_1$, to provide a thrust reversing force.

The louver rod 72 moves in unison with the nozzle doors 54a and 54b to pivot the louvers 74. In the illustrated position, the louvers 74 direct a portion of the bypass airflow D that discharges aft of the first nozzle door 54a in a forward direction $Z_2$. In this position, the louvers 74 provide the benefit of achieving additional thrust reversing force from the portion of the bypass airflow D that discharges aft of the first nozzle door 54a.

As can be appreciated from the illustrations, as the first link 62 moves, the second link 68 pivots about the trunnion pivot 70. This provides the benefit of allowing the second link 68 a degree of freedom to move with the first link 62 in an arcuate path about pivot connection 58c.

Upon completion of landing, the controller 44 commands the actuator 42 to extend the actuator rod 78 to move the linkage 60 and the nozzle doors 54a and 54b in an opposite manner from that described above to the intermediate position or stowed position, depending on input parameters into the controller 44.

Figure 7:
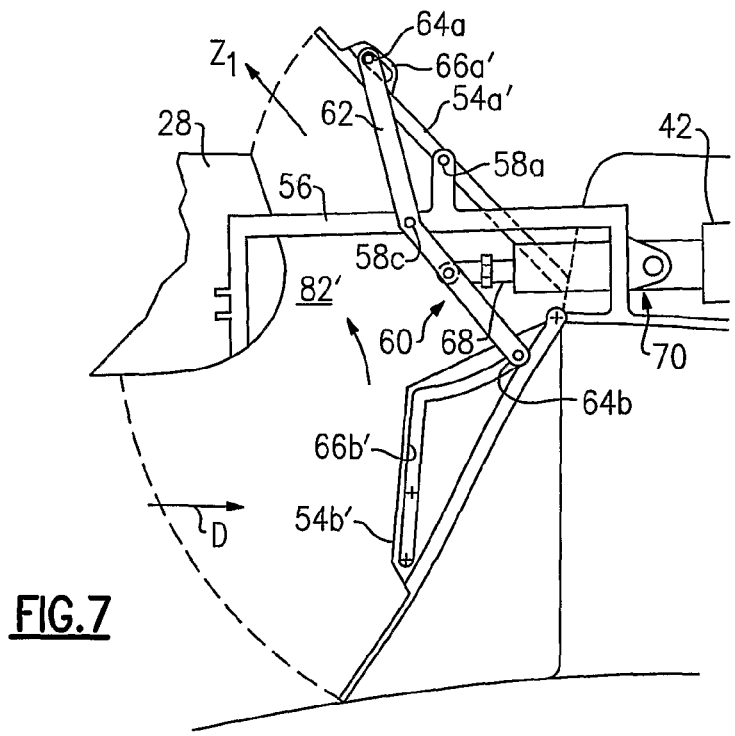
FIG. 7 is a schematic view of another embodiment of the nozzle doors and linkage, in a thrust reverse position.

FIG. 7 illustrates a modified example nozzle 40' wherein the nozzle doors 54a' and 54b' and slots 66a' and 66b' are different from the example shown in FIGS. 2, 3, and 5. In his example, the slot 66a' is not as long as the slot 66a of the previous example, and the slot 66b' is non-linear. Thus, as the actuator 42 moves the linkage 60, the section 64a moves along the slot 66a' and the section 64b of the first link 62 moves along the non-linear slot 66b'. The non-linear slot 66b' permits the first link 62 to rotate through a larger range of motion than in the previous example, which in turn permits the outer nozzle door 54a' to open wider than in the previous example to direct the bypass airflow D in the forward direction $Z_1$. In this example, the opening the outer nozzle door 54a' wider additionally allows the louvers 74 of the previous example to be eliminated.

The disclosed example nozzles 40, 40' thereby integrates the functions of varying the cross-sectional area of the bypass passage 30 to influence the bypass airflow D in a desired manner and thrust reversal for slowing forward movement of an aircraft. Although a preferred embodiment of this invention has been disclosed, a worker of ordinary skill in this art would recognize that certain modifications would come within the scope of this invention. For that reason, the following claims should be studied to determine the true scope and content of this invention.

I claim:

1. A nozzle for use in a gas turbine engine, comprising:
a frame supported by a nacelle;
first and second nozzle doors that move in unison between a plurality of positions to influence a bypass airflow through a fan bypass passage, wherein the first and second nozzle doors are pivotally connected to the frame;
a louver section that moves in unison with the nozzle doors between a plurality of louver positions;
a linkage connecting the nozzle doors and the louver section; and
an actuator coupled with the linkage, wherein the actuator is selectively operative to move the nozzle doors and the louver section in unison using the linkage and the actuator is disposed downstream of a portion of the frame.

2. The nozzle as recited in claim 1, wherein the first nozzle door is radially outwards of the second nozzle door relative to an engine centerline axis.

3. The nozzle as recited in claim 1, wherein the linkage includes a link that is slidably connected to each of the nozzle doors.

4. The nozzle as recited in claim 1, wherein the linkage includes a link having a first linear section that extends in a first lengthwise direction and a second linear section that extends in a second lengthwise direction that is transverse to the first lengthwise direction.

5. The nozzle as recited in claim 1, wherein each of the nozzle doors are moveable about a pivot point.

6. The nozzle as recited in claim 1, wherein the linkage includes a first link and a second link, the first link is pivotally connected to the frame and the second link is pivotally connected to the first link and the actuator.

7. The nozzle as recited in claim 1, wherein the louver section includes a plurality of louvers that are pivotally connected to the frame.

8. The nozzle as recited in claim 1, wherein the first and second nozzle doors each include a slot that slidably receives a portion of the linkage.

9. A nozzle for use in a gas turbine engine, comprising:
first and second nozzle doors that move in unison between a plurality of positions to influence a bypass airflow through a fan bypass passage;
a louver section that moves in unison with the nozzle doors between a plurality of louver positions
a linkage connecting the nozzle doors and the louver section, wherein the linkage includes a link that is slidably connected to each of the nozzle doors, and the linkage includes another link having one end that is pivotally connected with the link and another end that is pivotally connected with the actuator; and
an actuator coupled with the linkage, wherein the actuator is selectively operative to move the nozzle doors and the louver section in unison using the linkage.

10. A nozzle for use in a gas turbine engine, comprising:
first and second nozzle doors that move in unison between a plurality of positions to influence a bypass airflow through a fan bypass passage, wherein the first nozzle door includes a linear slot and the second nozzle door includes a non-linear slot;
a louver section that moves in unison with the nozzle doors between a plurality of louver positions;
a linkage connecting the nozzle doors and the louver section, wherein the linear slot and the non-linear slot are slidably connected with the linkage; and
an actuator coupled with the linkage, wherein the actuator is selectively operative to move the nozzle doors and the louver section in unison using the linkage.

11. A nozzle for use in a gas turbine engine, comprising:
first and second nozzle doors that move in unison between a plurality of positions to influence a bypass airflow through a fan bypass passage, wherein each of the nozzle doors are moveable about a pivot point, and the first nozzle door moves in an aft direction about its pivot point in unison with movement of the second nozzle door in a forward direction about its pivot point;
a louver section that moves in unison with the nozzle doors between a plurality of louver positions;
a linkage connecting the nozzle doors and the louver section; and an actuator coupled with the linkage, wherein the actuator is selectively operative to move the nozzle doors and the louver section in unison using the linkage.

12. A nozzle for use in a gas turbine engine, comprising:
first and second nozzle doors that move in unison between a plurality of positions to influence a bypass airflow through a fan bypass passage;
a louver section that moves in unison with the nozzle doors between a plurality of louver positions, wherein the louver section directs the bypass airflow in a forward direction in one of the plurality of louver positions and directs the bypass airflow in an aft direction in another of the plurality of positions;
a linkage connecting the nozzle doors and the louver section; and
an actuator coupled with the linkage, wherein the actuator is selectively operative to move the nozzle doors and the louver section in unison using the linkage.

13. A nozzle for use in a gas turbine engine, comprising:
first and second nozzle doors that move in unison between a plurality of positions to influence a bypass airflow through a fan bypass passage;
a louver section that moves in unison with the nozzle doors between a plurality of louver positions, wherein the louver section includes a plurality of louvers that are each moveable about corresponding pivots, each of the plurality of louvers including an end that is connected with a link rod that connects to the linkage, wherein movement of the linkage causes movement of the link rod such that the plurality of louvers move about the pivots;
a linkage connecting the nozzle doors and the louver section; and
an actuator coupled with the linkage, wherein the actuator is selectively operative to move the nozzle doors and the louver section in unison using the linkage.

14. A gas turbine engine system comprising:
a fan;
a nacelle arranged about the fan;
a frame supported by a nacelle;
a gas turbine engine core having a compressor and a turbine at least partially within the nacelle;
a fan bypass passage downstream of the fan for conveying a bypass airflow;
between the nacelle and the gas turbine engine core;
first and second nozzle doors associated with the fan bypass passage that move in unison between a stowed position, an intermediate position, and a thrust reverse position to influence the bypass airflow, wherein the first and second nozzle doors are pivotally connected to the frame;
a louver section that moves in unison with the first and second nozzle doors between a plurality of louver positions;
a linkage connecting the nozzle doors and the louver section; an actuator coupled with the linkage; and
a controller that selectively commands the actuator to move the nozzle doors and the louver section in unison using the linkage and the actuator is disposed downstream of a portion of the frame.

15. The gas turbine engine system as recited in claim 14, wherein the stowed position corresponds to an aircraft cruise condition, the intermediate position corresponds to an aircraft take-off condition, and the thrust reverse position corresponds to an aircraft condition after landing.

16. The gas turbine engine system as recited in claim 14, wherein the first nozzle door extends in a radially outward direction from the nacelle relative to a centerline axis of the gas turbine engine core, and the second nozzle door extends in a radial inward direction into the fan bypass passage in the intermediate position and the thrust reverse position.

17. The gas turbine engine system as recited in claim 16, wherein the nozzle doors direct the bypass airflow in an aft direction to provide thrust while in the intermediate position, and the nozzle doors direct the bypass airflow in a forward direction to produce a thrust reversing force in the thrust reverse position.

18. The gas turbine engine system as recited in claim 14, wherein movement of the nozzle doors changes a variable cross-sectional area associated with the fan bypass passage to influence the bypass airflow.

19. The gas turbine engine system as recited in claim 14, wherein the linkage includes a first link and a second link, the first link is pivotally connected to the frame and the second link is pivotally connected to the first link and the actuator.

20. The gas turbine engine system as recited in claim 14, wherein the louver section includes a plurality of louvers that are pivotally connected to the frame.

21. The gas turbine engine system as recited in claim 14, wherein the first and second nozzle doors each include a slot that slidably receives a portion of the linkage.

22. The gas turbine engine system as recited in claim 14, wherein the linkage includes a link that is slidably connected to each of the nozzle doors.

23. The gas turbine engine system as recited in claim 22, wherein the linkage includes another link having one end that is pivotally connected with the link and another end that is pivotally connected with the actuator.

24. The gas turbine engine system as recited in claim 14, wherein the first nozzle door includes a linear slot, the second nozzle door includes a non-linear slot, and the linear slot and the non-linear slot are slidably connected with the linkage.

25. The gas turbine engine system as recited in claim 14, wherein each of the nozzle doors are moveable about a pivot point.

26. The gas turbine engine system as recited in claim 25, wherein the first nozzle door moves in an aft direction about its pivot point in unison with movement of the second nozzle door in a forward direction about its pivot point.

27. The gas turbine engine system as recited in claim 14, wherein the louver section includes a plurality of louvers that are each moveable about corresponding pivots, each of the plurality of louvers including an end that is connected with a link rod that connects to the linkage, and movement of the linkage causes movement of the link rod such that the plurality of louvers move about the pivots.

* * * * *